US005271859A

United States Patent [19]

Roe

[11] Patent Number: 5,271,859

[45] Date of Patent: Dec. 21, 1993

[54] METHODS FOR CONTROLLING DUST IN HIGH TEMPERATURE SYSTEMS

[75] Inventor: Donald C. Roe, Tabernacle, N.J.

[73] Assignee: Betz Laboratories, Inc., Trevose, Pa.

[21] Appl. No.: 927,767

[22] Filed: Aug. 10, 1992

[51] Int. Cl.$^5$ .......................... C09K 3/22; C10L 10/00

[52] U.S. Cl. .......................................... 252/88; 44/602

[58] Field of Search .................... 252/88; 44/602, 500, 44/501

[56] References Cited

U.S. PATENT DOCUMENTS

| | | | |
|---|---|---|---|
| 3,954,662 | 5/1976 | Salyer et al. | 252/382 |
| 4,369,121 | 1/1983 | Callahan et al. | 252/88 |
| 4,380,459 | 4/1983 | Netting | 55/87 |
| 4,417,992 | 11/1983 | Bhattacharyya et al. | 252/88 |
| 4,642,196 | 2/1987 | Yan | 252/88 |
| 4,650,598 | 3/1987 | Roberts et al. | 252/88 |
| 4,659,494 | 4/1987 | Soldonski et al. | 252/88 |
| 4,780,143 | 10/1988 | Roe | 106/102 |
| 4,836,945 | 6/1989 | Kestner | 252/88 |

*Primary Examiner*—Prince Willis, Jr.
*Assistant Examiner*—J. Silbermann
*Attorney, Agent, or Firm*—Alexander D. Ricci; Philip H. Von Neida

[57] ABSTRACT

Method for inhibiting dust emissions from hot (250° F.) solids are provided for. The method comprises adding to the solids an aqueous solution or foamed solution of a cellulose derivative compound.

13 Claims, No Drawings

METHODS FOR CONTROLLING DUST IN HIGH TEMPERATURE SYSTEMS

FIELD OF THE INVENTION

The invention pertains to improved methods for reducing the dustiness of hot particulate solids.

BACKGROUND OF THE INVENTION

Dust control, as used herein, is defined as the prevention or reduction of the extent to which fine particulates become airborne or suspended in air. Dust is generated in significant quantities during the mining, handling, transportation, and storage of coal; dust is also generated during the processing, transportation and handling of rock, green and calcined petroleum coke, ores (for example iron ore), grains, limestone, gypsum, fly ash, cement clinker, bauxite and fertilizers (such as potash and phosphates), among others. Road dust also proves to be a problem.

Industrial sources of fugitive dust include open operations, leaks and spills, storage, disposal, transit or poor housekeeping of sundry finely divided solid particulates. The iron and steel industries are replete with examples of the above enumerated categories. Wind erosion of exposed masses of particulate matter such as coal or mine mill tailings, fertilizer, etc., causes both air pollution and economic waste. Detrimental effects on health and cleanliness result where these fine particles are carried aloft by the winds.

Hot substrates (>120° F.) pose a more difficult problem for controlling dust emissions than substrates at ambient temperatures. Water is typically used as the primary active and distribution medium for dust control at ambient temperatures. However, at elevated temperatures, water evaporates quickly, and loses effectiveness at controlling dust emissions.

SUMMARY OF THE INVENTION

The instant invention pertains to methods for reducing dust emissions from hot particulate solids. Cellulose derivatives in aqueous solutions provide high temperature dust control. These solutions are applied either as a liquid spray or as an aqueous foam.

DESCRIPTION OF THE RELATED ART

A foamed dust control agent is employed in U.S. Pat. No. 4,780,143 Roe, to suppress dust generation from cement clinker. The foam contains an antifoaming agent which acts to inhibit foam formation in the slurried cement. U.S. Pat. No. 3,954,662, Salyer et al., teaches a process of coal dust control employing a composition of water, a polymerizable vinyl ester and a partial ester compound interpolymerizable therewith.

Netting, U.S. Pat. No. 4,380,459, teaches methods for reducing the amount of coal dust in a coal mining environment comprising a foam consisting of water, a surfactant and a synthetic gum. U.S. Pat. No. 4,417,992, Bhattacharyya et al., teaches a method of inhibiting dust control employing a liquid dispersion of a highly branched water swellable polymer such as acrylamide and methylene-bis-acrylamide.

U.S. Pat. No. 4,836,945, Kestner, teaches methods for suppressing dust from the surface of bulk coal by applying an aqueous suspension of up to 20 percent cellulosic fibers to the coal. The fibers are derived from wood pulp that has been chemically or mechanically treated. Roberts et al., U.S. Pat. No. 4,650,598, teaches methods for suppressing dust with an emulsion of water, a methacrylate polymer, a hydrophobic liquid and an emulsifying surfactant.

DETAILED DESCRIPTION OF THE INVENTION

The present invention relates to methods for reducing dust emissions from hot particulate solids comprising adding to said solids a dust inhibiting amount of a cellulose derivative compound.

For purposes of this application, "hot particulate solids" are meant to include particulate solids at temperatures greater than 120° F. The methods of the instant invention can be employed with most high temperature substrates with the capacity for generating fugitive dust emissions. This can include those substrates at temperatures up to 600° F.

The cellulose derivatives employed include cellulose ethers such as methylcellulose, hydroxypropylmethylcellulose and hydroxyethylcellulose. Examples of commercially available products include Methocel® A15C, Methocel® K4M and Natrosol® 2504, respectively. The Methocel® products are available from the Dow Chemical Company and the Natrosol® products are available from Hercules Incorporated. The preferred cellulose derivatives are those that undergo thermal gelation at elevated temperatures. It is postulated that water associated with a cellulose derivative solution would become trapped in a gel matrix when the solution contacts a hot substrate.

This method allows water to be used as the primary active ingredient and distribution medium. This results in a more economical dust control method than that provided by oil-based binders.

The cellulose polymers of the instant invention generally have molecular weights in the range of about 10,000 to about 500,000. The preferred range of molecular weights range from about 50,000 to about 250,000.

The polymers of the instant invention may be applied to the hot substrate by either spraying as a liquid onto the hot substrate or by applying as a foam which incorporates an effective surfactant-based foaming agent. The liquid spray incorporates a suitable solvent for the polymers. Preferably, that solvent is aqueous based.

Aqueous solutions of 0.1 to 10.0% polymer can be sprayed or foamed onto the hot substrate. The feed rate of sprayed aqueous solution ranges from about 0.5 to about 10.0 gallons of solution per ton of substrate. Preferably, 1.0 to about 5.0 gallons per ton of substrate are applied. When applied as a foam, the treatment polymers are fed in a range from about 0.25 to about 5.0 gallons of foamed solution per ton of substrate. Preferred foam feed rates range from about 0.5 to about 2.5 gallons per ton of substrate.

The polymers of the instant invention are effective at providing dust control for a variety of hot substrates. Calcined petroleum coke, cement clinker, steel mill sinter and thermally-dried coal would all be effectively treated by the methods of the instant invention.

The cellulose ether polymers of the instant invention can also be used with other additives for improved dust control. Plasticizers which exhibit solubilizing effects on the cellulose ether polymers may be useful for certain substrates and temperature conditions. These plasticizers include diethylene glycol, propylene glycol, triethanolamine, glycerol and sorbitol. Additives such as sucrose and glycerine can be used to lower gel point temperature which could be beneficial for some applications. In addition to acting as foaming agents, anionic, nonionic and/or cationic surfactants can be employed to improve the wetting properties of cellulose ether polymer solutions.

In order to more clearly illustrate this invention, the data set forth below was developed. The following examples are included as being illustrations of the invention and should not be construed as limiting the scope thereof.

EXAMPLES

In order to demonstrate the efficacy of the cellulose ether polymers at inhibiting dust emissions a series of laboratory tests were undertaken.

The particulate, dusty material treated was minus ¼ inch, 250 gram samples of hot (250° F.) calcined petroleum coke. The cellulose ether polymers were tested by themselves as well as comparatively with an oil-based dust inhibitor. All treatments were applied as 1% solutions at a rate of 10% by weight of coke. Relative dustiness was measured hot, after the coke was heated for one hour, and cold, after the coke was heated for one hour and then allowed to cool following the treatment. Relative dustiness (RDI) was measured using a laboratory dust chamber. % dust suppression (% DS) was calculated based on the RDI of treated and untreated samples.

$$\% \text{ dust suppression} = \frac{\text{untreated } RDI - \text{treated } RDI}{\text{untreated } RDI} \times 100\%$$

Test Results are reported in Table I

TABLE I

| | Relative Dustiness | | | |
|---|---|---|---|---|
| | Hot (250° F.) | | Cold (70° F.) | |
| Treatment Agent | RDI | % DS | RDI | % DS |
| Control | 25.4 | — | 24.9 | — |
| Oil-Based Binder[1] | 11.5 | 54.7 | 5.5 | 77.9 |
| Methylcellulose[2] | 0.8 | 96.9 | 3.4 | 86.3 |
| Hydroxypropyl methylcellulose[3] | 3.7 | 85.4 | 1.8 | 92.8 |
| Hydroxyethylcellulose[4] | 1.6 | 93.7 | 2.2 | 91.2 |

[1]available as FlowPro ® 1500
[2]available as Methocel ® A15C
[3]available as Methocel ® K4M
[4]available as Natrosol ® 250H
FlowPro ® 1500 is available from Betz Laboratories, Inc., Trevose, PA.

As Table I indicates, calcined coke samples treated with the cellulose ether polymers of the instant invention are far less dusty than the control samples. They also show substantial dust control improvement over the known oil-based dust inhibitor.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what I claim is:

1. A method for reducing the emission of dust from hot particulate solids having a temperature greater than 250° F. comprising contacting the bulk of the particulate solids with an aqueous solution of about 0.1 to 10.0% of a cellulose derivative compound.

2. The method as claimed in claim 1 wherein said cellulose derivative compound is methylcellulose.

3. The method as claimed in claim 1 wherein said cellulose derivative compound is hydroxypropylmethylcellulose.

4. The method as claimed in claim 1 wherein said cellulose derivative compound is hydroxyethylcellulose.

5. The method as claimed in claim 1 wherein said cellulose derivative compound has a molecular weight of about 10,000 to about 500,000.

6. The method as claimed in claim 1 wherein said cellulose derivative compounds are added to said solids by spraying as a liquid.

7. The method as claimed in claim 1 wherein said cellulose derivative compounds are added to said solids as a foamed liquid.

8. The method as claimed in claim 1 wherein said solution is sprayed onto said solids from about 0.5 to about 10 gallons of said solution per ton of said solids.

9. The method as claimed in claim 10 wherein said foam is applied to said solids in an amount from about 0.25 to about 5.0 gallons per ton of said solids.

10. The method as claimed in claim 1 wherein said solids are selected from the group consisting of calcined petroleum coke, cement clinker, steel mill sinter and thermally-dried coal.

11. The method as claimed in claim 1 wherein said cellulose derivative compounds are added to said solids with plasticizing agents.

12. The method as claimed in claim 1 wherein said cellulose derivative compounds are added to said solids with surfactant foaming agents.

13. The method as claimed in claim 1 wherein said cellulose derivative compounds are added to said solids with surfactant wetting agents.

* * * * *